3 Sheets--Sheet 1

E. JONES.

Apparatus for the Manufacture of Illuminating Gas.

No. 5,771. Reissued Feb. 24, 1874.

*Witnesses:*
*George E. Phelps.*
*Edwin E Bean*

*Inventor:*
*Edward Jones*
*by Alban Endrew atty.*

AM. PHOTO-LITHOGRAPHIC Co. N. Y. (OSBORNE'S PROCESS.)

3 Sheets--Sheet 2.

E. JONES.

Apparatus for the Manufacture of Illuminating Gas.

No. 5,771. Reissued Feb. 24, 1874.

Witnesses.
George E. Phelps.
Edwin E. Bean

Inventor:
Edward Jones
by Albert Andrews, atty.

AM. PHOTO-LITHOGRAPHIC Co. N.Y. (OSBORNE'S PROCESS.)

3 Sheets--Sheet 3.

E. JONES.

Apparatus for the Manufacture of Illuminating Gas.

No. 5,771. Reissued Feb. 24, 1874.

Witnesses:
George E. Phelps.
Edwin E. Bean

Inventor.
Edward Jones.
by Alban Andrén. atty.

AM. PHOTO-LITHOGRAPHIC CO. N. Y. (OSBORNE'S PROCESS.)

UNITED STATES PATENT OFFICE.

EDWARD JONES, OF BOSTON, MASSACHUSETTS, ASSIGNOR, BY MESNE ASSIGNMENTS, TO JOHN H. BLAKE AND JOSEPH W. SMITH, TRUSTEES OF THE AMERICAN COAL-GAS-LIGHT IMPROVEMENT COMPANY, OF SAME PLACE.

IMPROVEMENT IN APPARATUS FOR THE MANUFACTURE OF ILLUMINATING-GAS.

Specification forming part of Letters Patent No. 116,450, dated June 27, 1871; reissue No. 4,800, dated March 12, 1872; reissue No. 5,771, dated February 24, 1874; application filed November 28, 1873.

*To all whom it may concern:*

Be it known that I, EDWARD JONES, of Boston, in the county of Suffolk and State of Massachusetts, have invented certain new and useful Improvements in Apparatus for the Manufacture of Illuminating-Gas; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
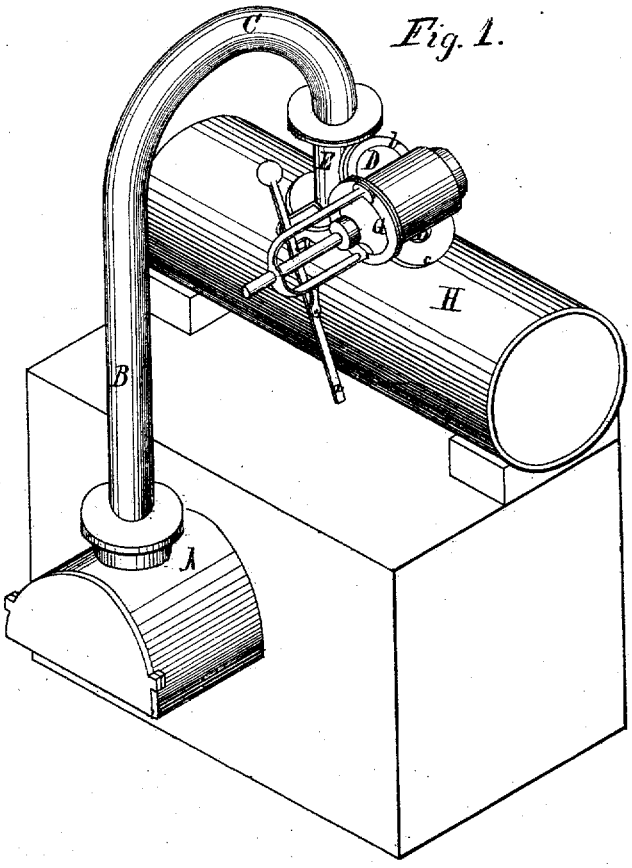
Figure 2:
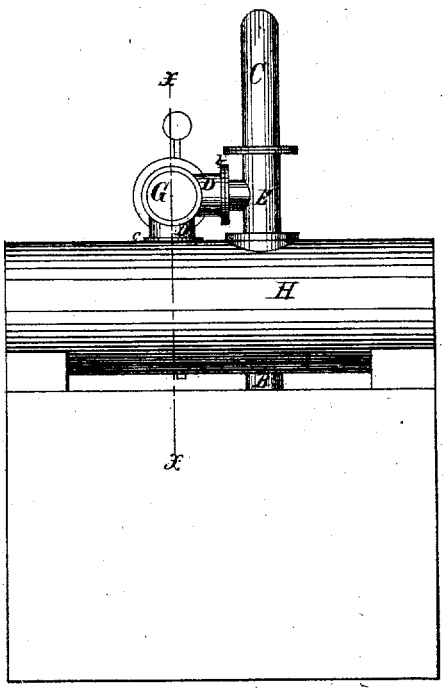
Figure 4:
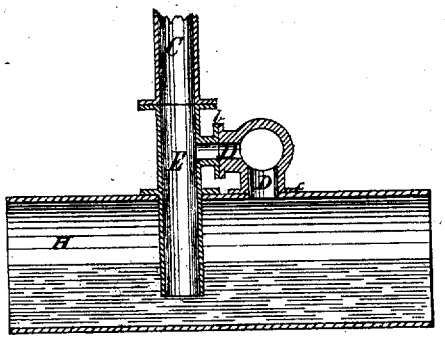
Figure 3:
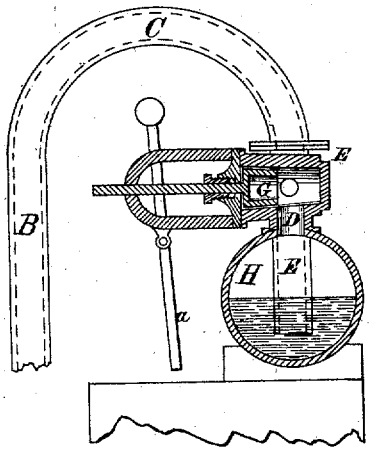

Figure 1 is a perspective view of the apparatus complete. Fig. 2 is a rear elevation of the same. Fig. 3 is a transverse vertical section on the line *x x* of Fig. 2. Fig. 4 is a longitudinal vertical section through the hydraulic main and pipes immediately connected therewith.

The method commonly employed in gas-works of cutting off communication between the retort and the hydraulic main during the drawing of the charge is by means of a dip-pipe descending into, and sealed by, the liquid contents of the main. When these dip-pipes are used, however, the pressure under which the gas is made checks and diminishes its production, and hastens the accumulation of fixed carbon in the retorts, which thus accelerates their destruction. To overcome these objections gas apparatus have been constructed in which dip-pipes are dispensed with, and the retorts operated without pressure by the introduction of a valve at some convenient point between the retort and the hydraulic main, the said valve, when closed, effectually shutting off communication, as required when the retort is to be charged, and, when open, allowing the free production and flow of the gas into the hydraulic main. This apparatus, although it produces the most advantageous results, by increasing the production of gas from a given quantity of coal, and retarding the accumulation of fixed carbon within the retorts, was, nevertheless, liable to the objection that, in case the person in charge neglected to open the valve at the commencement of the generation of the gas, the pressure within the retort would cause the luting to be blown out; and, if the valve was still permitted to remain closed, it would endanger the safety of the works.

My invention has for its object to remove these difficulties; and it consists in a gas apparatus having two outlets for conducting the gas from the retort into a main or receiver, one of these outlets being covered with a valve or cut-off, which, when open, will allow the gas to flow freely into the upper part of the main without passing through the liquid contents thereof, the other outlet or pipe extending down into the hydraulic main to a sufficient distance to form an ordinary dip-pipe, which is sealed by the liquid contents of the hydraulic main; by which arrangement, when the valve or cut-off is open, the gas will flow freely and without pressure to the main without passing through the liquid contents thereof; while, if the valve or cut-off is allowed to remain closed, through negligence, during the production of the gas, it will pass through the dip-pipe into the hydraulic main in the ordinary way, thus effectually guarding against and preventing the slightest possibility of an accident, as the gas can pass at all times from the retort by one or the other of the outlets into the main, whether the valve or cut-off is open or closed.

It is not important where the valve covering the outlet from the stand-pipe to the hydraulic main is located. In all cases I wish to establish one outlet from the stand-pipe covered by the liquid contents of the main, and one direct passage leading from the stand-pipe—or any point between the retort and the surface of the liquid contents of the main—to the gas-containing part of the main.

To enable others skilled in the art to understand and use my invention, I will proceed to describe the manner in which I have carried it out.

In the said drawings, A represents an ordinary retort, from which rises the stand-pipe B, leading to the bridge-pipe C. D and E are two outlets, which are connected with the bridge-pipe C. One of these outlets, D, which is provided with a valve or cut-off, G, merely communicates with the gas-containing part of the main H, without descending into the liquid contents thereof, while the other outlet, E, extends down into the main H, forming a dip-pipe, which is sealed in the liquid contents of the main, as seen in Fig. 4.

When it is desired to draw the charge from the retort A, the valve G is closed by means of the lever *a*, or suitable device, which effectually cuts off communication between the retort and the hydraulic main H, through the opening or pipe D, while the gas cannot flow back to the retort through the outlet E, as its lower end is sealed in the liquid contents of the main. As soon as the retort has been charged, the valve G is opened, which allows the gas to flow freely, and without pressure, through the outlet D, into the gas-containing part of the main H, thereby effectually preventing all danger of explosion or accident.

Any suitable valve or cut-off may be applied to the outlet D; and, instead of leading the pipe or opening D into the hydraulic main, it may be led directly to the point to which it is desired to conduct the gas without departing from the spirit of my invention, the principle of which consists in providing a means for conducting the gas from the retort to the desired point at all times, whether the valve G is open or closed.

When the valve G is situated outside the main, it can easily be reached for repairs; and, in case it should become necessary to temporarily remove the outlet D with its valve, in this case suitable caps can be applied at the points *b c*, (shown in Fig. 4,) and the gas allowed to pass through the dip-pipe into the hydraulic main in the usual manner, thus avoiding delay and inconvenience.

What I claim as my invention, and desire to secure by Letters Patent, is—

In apparatus for producing gas from coal, the combination of the hydraulic main H, the dip-pipe E, and valve-pipe D, or outlet, or its equivalent, when open, enabling the gas to be produced in the retort without pressure; the dip-pipe E, or its equivalent, when the outlet D is closed, enabling any gas contained in the retort to escape therefrom whenever it reaches a pressure higher than that of the dip-seal.

In testimony that I claim the foregoing I have hereunto set my hand this 26th day of November, 1873.

EDWARD JONES.

Witnesses:
ALBAN ANDRÉN,
GEORGE E. PHELPS.